(12) United States Patent
Kieren et al.

(10) Patent No.: US 9,988,054 B2
(45) Date of Patent: Jun. 5, 2018

(54) METHOD AND DEVICE FOR ASCERTAINING A MINIMUM VALUE FOR THE FRICTION COEFFICIENT OF A ROAD SEGMENT

(71) Applicant: Robert Bosch GmbH, Stuttgart (DE)

(72) Inventors: Martin Kieren, Marbach A. N. (DE); Nils Hagenlocher, Stuttgart (DE); Erik Lesser, Steinheim (DE); Andreas Offenhaeuser, Marbach am Neckar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 173 days.

(21) Appl. No.: 15/186,878

(22) Filed: Jun. 20, 2016

(65) Prior Publication Data

US 2016/0368504 A1 Dec. 22, 2016

(30) Foreign Application Priority Data

Jun. 22, 2015 (DE) .................... 10 2015 211 482

(51) Int. Cl.
*B60W 40/068* (2012.01)
(52) U.S. Cl.
CPC ..... *B60W 40/068* (2013.01); *B60W 2550/302* (2013.01); *B60W 2550/306* (2013.01)

(58) Field of Classification Search
CPC ......... B60W 40/068; B60W 2550/306; B60W 2550/302
See application file for complete search history.

(56) References Cited

U.S. PATENT DOCUMENTS 5,675,492 A * 10/1997 Tsuyuki ............. G01C 21/3407
340/988

FOREIGN PATENT DOCUMENTS

DE 102006032735 A1 1/2008

* cited by examiner

*Primary Examiner* — Yuen H Wong
(74) *Attorney, Agent, or Firm* — Norton Rose Fulbright US LLP; Gerard Messina

(57) ABSTRACT

A method for ascertaining a minimum value for the friction coefficient of a road segment, in which at least one movement variable of a second vehicle, which characterizes the vehicle movement, is ascertained with the aid of a surroundings sensor system contained in a first vehicle; a minimum value for the friction coefficient of the road segment traveled by the second vehicle is ascertained on the basis of the at least one movement variable of the second vehicle; the spatial position of the first vehicle is ascertained; the relative position of the second vehicle with respect to the first vehicle is ascertained with the aid of the surroundings sensor system; the spatial position of the second vehicle is ascertained with the aid of the spatial position and the relative position of the first vehicle; the spatial position of the second vehicle and the minimum value are stored in a database.

8 Claims, 1 Drawing Sheet

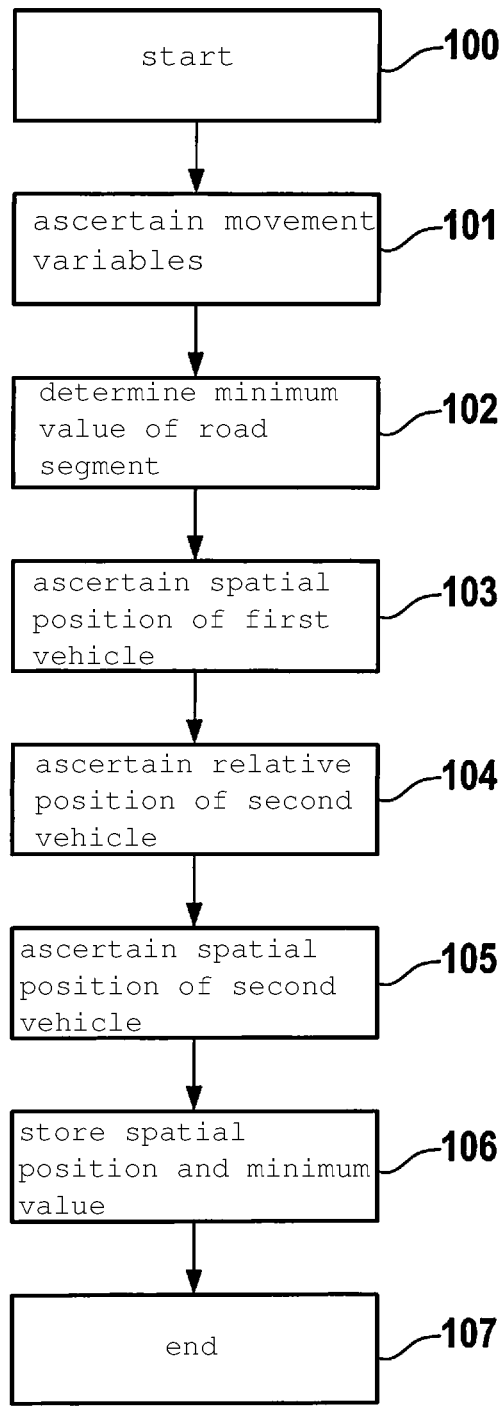

METHOD AND DEVICE FOR ASCERTAINING A MINIMUM VALUE FOR THE FRICTION COEFFICIENT OF A ROAD SEGMENT

CROSS REFERENCE

The present application claims the benefit under 35 U.S.C. § 119 of German Patent Application No. 102015211482.1 filed on Jun. 22, 2015, which is expressly incorporated herein by reference in its entirety.

BACKGROUND INFORMATION

A device for measuring the condition of a roadway is described in German Patent Application No. DE 10 2006 032 735 A1. This includes a radar sensor which emits a radar wave onto the roadway surface and evaluates the reflected signal.

SUMMARY

The present invention relates to a method for ascertaining a minimum value for the friction coefficient of a road segment, in which:
- at least one movement variable of a second vehicle characterizing the vehicle movement is ascertained with the aid of a surroundings sensor system contained in a first vehicle;
- a minimum value for the friction coefficient of the road segment traveled by the second vehicle is ascertained on the basis of the at least one movement variable of the second vehicle;
- the spatial position of the first vehicle is ascertained;
- the relative position of the second vehicle with respect to the first vehicle is ascertained with the aid of the surroundings sensor system;
- the spatial position of the second vehicle is ascertained with the aid of the spatial position and the relative position of the first vehicle;
- the spatial position of the second vehicle and the minimum value are stored in a database.

The present invention thus enables the evaluation of not only the host vehicle movement for ascertaining a minimum value for the instantaneous friction coefficient but also the analysis of the movement of adjacent vehicles and to ascertain their minimum values. Thus, a database of friction coefficients may be generated and updated significantly faster.

One advantageous embodiment of the present invention is characterized in that the movement variables of the second vehicle characterizing the vehicle movement may be its longitudinal acceleration or longitudinal deceleration.

One advantageous embodiment of the present invention is characterized in that the minimum value is ascertained in such a way that the longitudinal acceleration or longitudinal deceleration is divided by the gravitational acceleration. Since the gravitational acceleration is a constant, this embodiment requires particularly little effort.

One advantageous embodiment of the present invention is characterized in that the surroundings sensor system is a radar sensor system or a video sensor system. Since the mentioned sensor systems are increasingly found in modern vehicles, the implementation of the present invention does not incur an additional substantial extra effort.

One advantageous embodiment of the present invention is characterized in that the spatial position of the first vehicle is ascertained with the aid of a satellite-based positioning system. This may be, in particular, a GPS system which is also used in the context of vehicle navigation.

One advantageous embodiment of the present invention is characterized in that the relative position of the second vehicle is ascertained simultaneously or virtually simultaneously with the minimum value. This prevents instantaneously ascertaining the minimum value of the friction coefficient for that location at which the second vehicle is located.

One advantageous embodiment of the present invention is characterized in that the database is a vehicle-external database to which the spatial position of the second vehicle and the minimum value are wirelessly transmitted. The information contained in this database may, in particular, also be provided to additional vehicles.

The present invention also includes a device containing an arrangement which is configured to carry out the method according to the present invention. This is, in particular, a control unit in which the program code is stored for carrying out the methods according to the present invention.

BRIEF DESCRIPTION OF THE DRAWINGS

FIG. 1 shows the sequence of an embodiment of the method according to the present invention.

DETAILED DESCRIPTION OF EXAMPLE EMBODIMENTS

With the aid of existing sensor systems and with the aid of existing models from vehicle dynamics control systems and steering systems, an estimation of the road friction coefficients is possible. During acceleration or deceleration of the vehicle, the friction coefficient estimators ascertain the maximally used friction coefficients. During a control intervention of certain safety systems like ABS, ASR, vehicle dynamics control, or an active steering system, the maximum friction coefficient present is also ascertained. Thus, an estimation of the road friction coefficients is possible. In the case of a freely rolling vehicle, i.e., without deceleration or acceleration, no friction coefficient may be ascertained. To generate a friction coefficient map, it is necessary to ascertain the instantaneous friction coefficients as often as possible.

With the aid of radar or camera systems, it is possible to ascertain the movement variables of other vehicles or road users. The knowledge of these movement variables of other vehicles allows an estimation of the friction coefficient at their locations. Due to this incorporation of other vehicles, the frequency of friction coefficient ascertainment may be increased.

With the aid of the mentioned surroundings sensors, the instantaneous acceleration or deceleration of other vehicles may be ascertained and the at least prevailing friction coefficient may be ascertained therefrom. This at least prevailing friction coefficient is ascertained from the quotient a/g, where a is the instantaneous acceleration or deceleration of the other vehicle and g is the gravitational acceleration. In addition, ascertaining the instantaneous position of the measuring vehicle via a satellite navigation system is necessary to provide the ascertained friction coefficients of the other road users with a geocode. A geocode is the specification of variables, like coordinates, for example, with the aid of which the spatial position on the earth's surface is unambiguously establishable.

Since the distance of the other vehicle from the measuring vehicle is also establishable using the mentioned sensor systems, the geocode of the other vehicle may thus also be established to which the ascertained friction coefficient is assigned. Thus, the friction coefficient and the geocode may be transmitted to a server in which a friction coefficient map is stored and thus contribute to updating the friction coefficient map.

The sequence of an embodiment of the method for ascertaining a minimum value for the friction coefficient of a road segment is shown in FIG. 1. After the start of the method in block 100, the movement variables of a second vehicle, which characterize the vehicle movement, are ascertained in block 101 with the aid of a surroundings sensor system contained in a first vehicle. In block 102, a minimum value for the friction coefficient of the road segment traveled by the second vehicle is subsequently ascertained on the basis of the movement variables of the second vehicle. Subsequently in block 103, the spatial position of the first vehicle is ascertained, and thereafter in block 104, the relative position of the second vehicle is ascertained with respect to the first vehicle with the aid of the surroundings sensor system. In block 105, the spatial position of the second vehicle is ascertained with the aid of the spatial position and the relative position of the first vehicle, and in block 106, the spatial position of the second vehicle and the minimum value are stored in a database. The method according to the present invention ends in block 107. Upon considering these method steps, it is clear that some blocks may, of course, be exchanged in their sequence. For example, blocks 103 through 105 may also be carried out first, and subsequently blocks 101 and 102. However, blocks 103 through 105, for example, may also be carried out in parallel to blocks 101 and 102.

What is claimed is:

1. A method comprising:
   ascertaining, by a control unit of a first vehicle and based on output obtained by the control unit from a surroundings sensor system of the first vehicle, a value of an acceleration or deceleration of a second vehicle;
   ascertaining, by the control unit and based on a quotient calculated using the ascertained value of the acceleration or deceleration of the second vehicle and a constant, a respective friction coefficient value of a respective road segment traveled by the second vehicle during the ascertained acceleration or deceleration of the second vehicle;
   ascertaining, by the control unit and based on output obtained by the control unit from a geolocation device, a spatial position of the first vehicle;
   ascertaining, by the control unit and based on output obtained by the control unit from the surroundings sensor system, a relative position of the second vehicle with respect to the first vehicle;
   ascertaining, by the control unit and based on the ascertained spatial position of the first vehicle and the ascertained relative position, a spatial position of the respective road segment;
   causing, by the control unit and based on the ascertained spatial position of the respective road segment and the ascertained respective friction coefficient value, a friction coefficient map, which associates a plurality of friction coefficient values with respective ones of a plurality of positions of road segments, to be updated to identify the ascertained spatial position of the respective road segment in association with the ascertained respective friction coefficient value; and
   controlling, by the control unit and based on one or more of the associations of the friction coefficient map, a vehicle system of the first vehicle.

2. The method as recited in claim 1, wherein:
   the quotient is ascertained as the respective friction coefficient value;
   the quotient is of the longitudinal acceleration or deceleration divided by the constant; and
   the constant is a value of gravitational acceleration.

3. The method as recited in claim 1, wherein the surroundings sensor system includes at least one of a radar sensor system and a video sensor system.

4. The method as recited in claim 1, wherein the geolocation device includes or is a part of a satellite-based positioning system.

5. The method as recited in claim 1, wherein the relative position of the second vehicle is ascertained simultaneously or virtually simultaneously with the ascertainment of the respective friction coefficient value of the respective road segment traveled by the second vehicle during the ascertained acceleration or deceleration of the second vehicle.

6. The method as recited in claim 1, wherein the friction coefficient map is maintained on a vehicle-external server that wirelessly transmits information of the friction coefficient map to the first vehicle, and the causing of the friction coefficient map to be updated includes wirelessly transmitting to the server the ascertained spatial position of the respective road segment and the ascertained respective friction coefficient value.

7. A control unit of a first vehicle, the control unit storing a computer program that the control unit is configured to execute and that, when executed by the control unit, causes the control unit to perform a method, the method comprising:
   ascertaining, based on output obtained by the control unit from a surroundings sensor system of the first vehicle, a value of an acceleration or deceleration of a second vehicle;
   ascertaining, based on a quotient calculated using the ascertained value of the acceleration or deceleration of the second vehicle and a constant, a respective friction coefficient value of a respective road segment traveled by the second vehicle during the ascertained acceleration or deceleration of the second vehicle;
   ascertaining, based on output obtained by the control unit from a geolocation device, a spatial position of the first vehicle;
   ascertaining, based on output obtained by the control unit from the surroundings sensor system, a relative position of the second vehicle with respect to the first vehicle;
   ascertaining, based on the ascertained spatial position of the first vehicle and the ascertained relative position, a spatial position of the respective road segment;
   causing, based on the ascertained spatial position of the respective road segment and the ascertained respective friction coefficient value, a friction coefficient map, which associates a plurality of friction coefficient values with respective ones of a plurality of positions of road segments, to be updated to identify the ascertained spatial position of the respective road segment in association with the ascertained respective friction coefficient value; and
   controlling a vehicle system of the first vehicle based on one or more of the associations of the friction coefficient map.

8. A non-transitory computer-readable medium on which are stored instructions that are executable by a control unit of a first vehicle and that, when executed by the control unit, cause the control unit to perform a method, the method comprising:

ascertaining, based on output obtained by the control unit from a surroundings sensor system of the first vehicle, a value of an acceleration or deceleration of a second vehicle;

ascertaining, based on a quotient calculated using the ascertained value of the acceleration or deceleration of the second vehicle and a constant, a respective friction coefficient value of a respective road segment traveled by the second vehicle during the ascertained acceleration or deceleration of the second vehicle;

ascertaining, based on output obtained by the control unit from a geolocation device, a spatial position of the first vehicle;

ascertaining, based on output obtained by the control unit from the surroundings sensor system, a relative position of the second vehicle with respect to the first vehicle;

ascertaining, based on the ascertained spatial position of the first vehicle and the ascertained relative position, a spatial position of the respective road segment;

causing, based on the ascertained spatial position of the respective road segment and the ascertained respective friction coefficient value, a friction coefficient map, which associates a plurality of friction coefficient values with respective ones of a plurality of positions of road segments, to be updated to identify the ascertained spatial position of the respective road segment in association with the ascertained respective friction coefficient value; and controlling a vehicle system of the first vehicle based on one or more of the associations of the friction coefficient map.

* * * * *